United States Patent [19]
Williams

[11] Patent Number: 5,993,055
[45] Date of Patent: *Nov. 30, 1999

[54] FAULTY MODULE LOCATION IN A FAULT TOLERANT COMPUTER SYSTEM

[75] Inventor: Emrys John Williams, Tyrells End, United Kingdom

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,863

[22] Filed: Jun. 26, 1997

Related U.S. Application Data

[63] Continuation of application No. 08/675,264, Jul. 1, 1996, Pat. No. 5,799,022.

[51] Int. Cl.$^6$ .................................................. G06F 11/00
[52] U.S. Cl. ............................................................ 371/22.4
[58] Field of Search ................................. 371/22.4, 22.5, 371/36; 395/182.09, 182.21, 183.06, 183.07, 183.15; 364/228.3, 265

[56] References Cited

U.S. PATENT DOCUMENTS

| | | | |
|---|---|---|---|
| 4,807,228 | 2/1989 | Dahbura et al. | ........................ 395/182 |
| 5,630,048 | 5/1997 | La Joie et al. | ........................... 395/183 |

FOREIGN PATENT DOCUMENTS

| | | | |
|---|---|---|---|
| 0 415 549 | 7/1990 | European Pat. Off. | ........ G06F 11/16 |
| 39 30 075 | 9/1989 | Germany | ........................ G06F 11/16 |

OTHER PUBLICATIONS

Patent Abstracts Of Japan; vol. 10, No. 086 (P–443), Apr. 4, 1986.

IEEE Journal Of Solid–State Circuits, vol. 27, No. 1, Jan. 1992, pp. 4–16.

*Primary Examiner*—Vincent P. Canney
*Attorney, Agent, or Firm*—Blakely Sokoloff Taylor & Zafman

[57] ABSTRACT

A fault tolerant computer system includes a number of lockstep subsystems, each of which comprises a parallel input signature generator, used for data compression to allow practical comparison of the operation of internal modules of the lockstep subsystem, and a logic analyzer which stores the outputs of the internal modules of the lockstep subsystem. A signature comparator is connected to receive the signatures from the signature generators of the individual lockstep subsystems. The signature comparator generates a trigger signal for triggering the logic analyzers on detecting a difference in the signatures. The logic analyzers store enough states to include the first difference from a module following a detected difference in the signature outputs. The logic analyzer traces are searched automatically after an out-of-sync event to locate the first difference in operation and to determine which internal module provided the faulty output and then that module is labelled as broken.

38 Claims, 5 Drawing Sheets

FAULTY MODULE LOCATION IN A FAULT TOLERANT COMPUTER SYSTEM

This is a continuation of application Ser. No. 08/675,264 filed Jul. 1, 1996, now U.S. Pat. No. 5,799,022.

BACKGROUND AND INTRODUCTION

The invention relates generally to fault tolerant computer systems such as lockstep fault tolerant computers which use multiple subsystems that run identically.

In such lockstep fault tolerant computer systems, the outputs of the subsystems are compared within the computer and, if the outputs differ, some exceptional repair action is taken.

Figure 1:
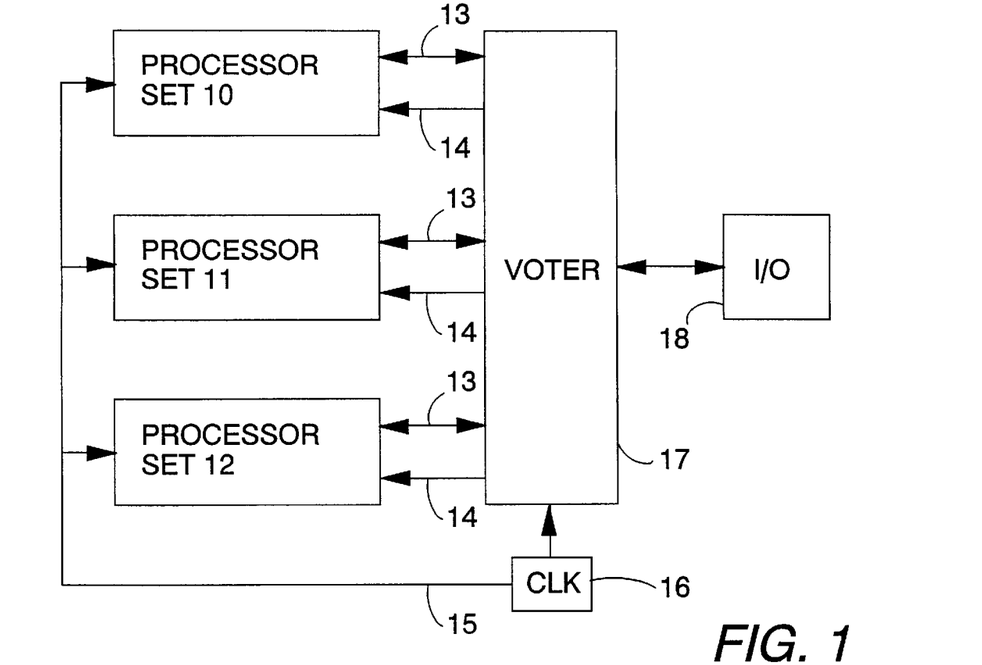
FIG. 1 is a schematic overview of a triple-modular-redundant fault tolerant computer system.

FIG. 1 of the accompanying drawings is a schematic overview of an example of a typical system, in which three identical processing (CPU) sets 10, 11, 12 operate in synchronism (sync) under a common clock 16. By a processing set is meant a subsystem including a processing engine, for example a central processing unit (CPU), and internal state storage.

As shown in FIG. 1, the outputs of the three processing sets 10, 11, 12 are supplied to a fault detector unit (voter) 17 to monitor the operation of the processing sets 10, 11, 12. If the processors sets 10, 11, 12 are operating correctly, they produce identical outputs to the voter 17. Accordingly, if the outputs match, the voter 17 passes commands from the processing sets 10, 11, 12 to an input/output (I/O) subsystem 18 for action. If, however, the outputs from the processing sets differ, this indicates that something is amiss, and the voter causes some corrective action to occur before acting upon an I/O operation.

Typically, a corrective action includes the voter supplying a signal via the appropriate line 14 to a processing set showing a fault to cause a "change me" light (not shown) to be illuminated on the faulty processing set. The defective processing set is switched off and an operator then has to replace it with a correctly functioning unit. In the example shown, a defective processing set can normally be easily identified by majority voting because of the two-to-one vote that will occur if one processing set fails or develops a temporary or permanent fault.

However, the invention is not limited to such systems, but is also applicable to systems where extensive diagnostic operations are needed to identify the faulty processing set. The system need not have a single voter, and need not vote merely I/O commands. The invention is generally applicable to synchronous systems with redundant components which run in lockstep.

A particular problem exists when each processing set itself consists of multiple independently replaceable units. While it may be easy to identify the faulty processing set, it may not be so easy to locate the particular faulty module within that processing set. It is highly desirable, for cost reasons, to replace just the single module rather than a whole processing set.

Figure 2:
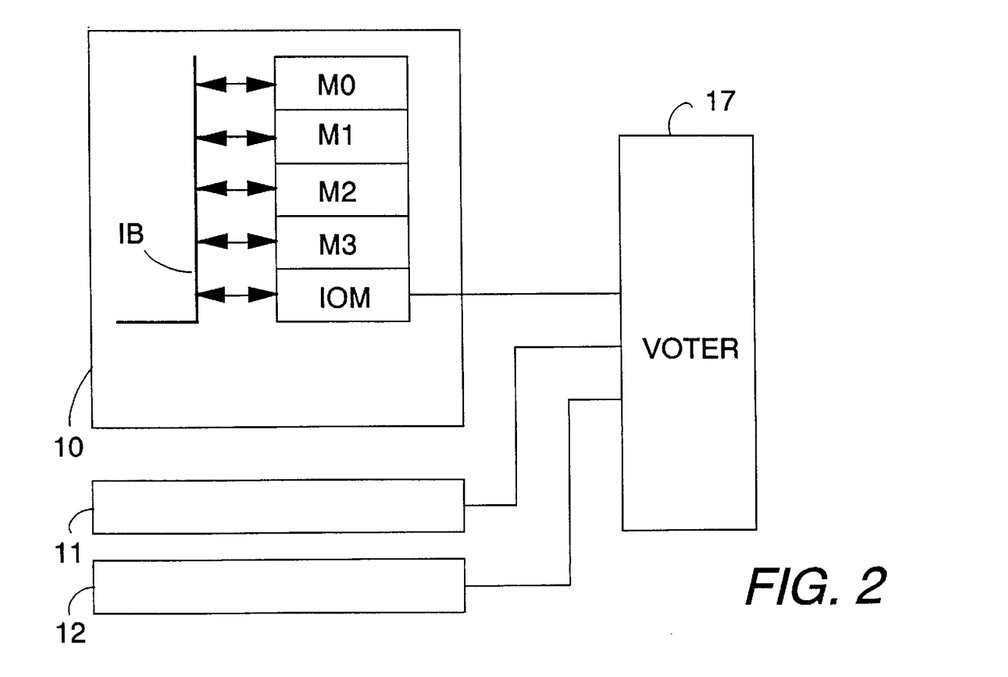
FIG. 2 is a schematic representation of elements of a processor set of the system of FIG. 1.

FIG. 2 shows a processing set made of multiple modules which, in this example, comprise modules M0–M3 and an input/output IOM. Processing set 11 and 12 are identical to processing set 10. In a lockstep system, the lockstep modules have to be synchronous to a common clock so that they do not get out of step. Each processing module in FIG. 2 operates synchronous with this clock, and processing module M0 in processing set 11 is normally operating identically to processing module M0 in processing set 10. The operation of such a synchronous module should be determined at all times by the inputs presented to the module and the internal stored state of the module. The stored state depends, in turn, on all the inputs presented to the module since the module started. In a lockstep system, both the inputs to processing module M0 and the internal stored state of processing module M0 are identical on all the processing sets, unless there is a fault.

Figure 3:
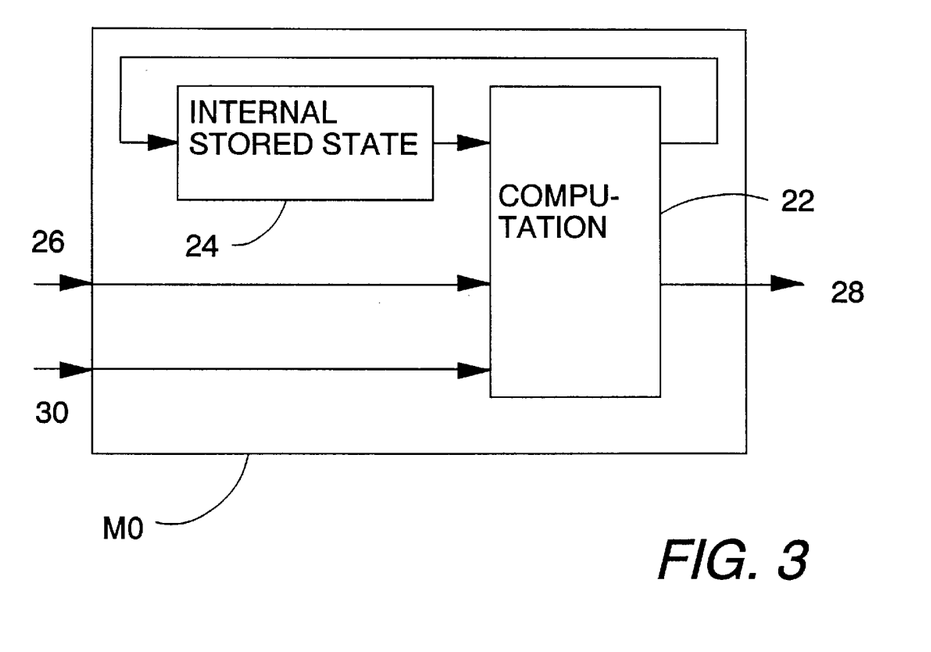
FIG. 3 is a schematic block diagram showing the functional elements of a processing module.

FIG. 3 is a schematic representation of the processing module M0, which includes a processing or computation unit 22 and internal state storage 24, where the internal stored state depends on the inputs 26 and contributes to the outputs 28. The stored state depends on the design of the module M0 and, potentially, on all the inputs that the module M0 has received. Each of the processing modules 10, 11 and 12 are identical. The processing modules are all clocked in response to a common clock input to the processing module at the clock input 30.

When a fault occurs within one of the modules M0–M3 of processing set 10, it is processing set 10 as a whole that is discarded. However, it may be that a single faulty module actually needs replacement before processing set 10 can be brought back into operation. The difficulty is to identify the faulty processing module.

An aim of the present invention it to provide a mechanism for locating a faulty module in a fault tolerant computer system.

SUMMARY OF THE INVENTION

In accordance with a first aspect of the invention, there is provided a subsystem for a fault tolerant computer system comprising a plurality of identical subsystems operable in lockstep, the subsystem comprising: at least one module having an input and an output, a signature generator having parallel inputs and at least one output, the signature generator input being connected to receive signals from the input and/or output of each module and the signature generator generating, at its output(s), a compressed signature which is a function of the signals received its inputs; and a logic analyzer connected to receive and store signals from the input and/or output of each module.

In accordance with another aspect of the invention, there is provided a fault tolerant computer system comprising: a plurality of identical subsystems operable in lockstep, wherein each subsystem comprises at least one module having an input and an output, a signature generator having parallel inputs and at least one output, the signature generator input being connected to receive signals from the input and/or output of each module and the signature generator generating, at its output(s), a compressed signature which is a function of the signals received its inputs, and a logic analyzer connected to receive signals from the input and/or output of each module and storing signals from the input and/or output of each module; and a signature comparator connected to receive the outputs of the signature generators of each of the subsystems, the signature comparator having a trigger output connected to a trigger input of the logic analyzer in each subsystem and generating a trigger signal on detecting a mis-comparison between the signatures.

In accordance with a further aspect of the invention, there is provided a method of identifying a faulty module in a subsystem of a fault tolerant computer system, the fault tolerant computer system comprising a plurality of identical subsystems operable in lockstep, and each subsystem comprising at least one module having an input and an output, the method comprising steps of: (a) generating a signature in a parallel input signature generator connected to receive signals from the input and/or output of each module, the signature being a compressed function of the inputs to the signature generator; (b) generating a logic analyzer trace including storing signals in a logic analyzer connected to receive signals from the input and/or output of each module; (c) comparing, in a signature comparator, the outputs of the signature generators of each subsystem; (d) triggering the logic analyzer in each subsystem on detecting a miscomparison between the signatures; and (e) comparing the signals stored in each logic analyzer to determine a first difference between the stored signals as indicative of a faulty module.

An embodiment of the invention enables all of the inputs and/or outputs of all of the modules in a processing set of a fault tolerant computer system to be monitored, without a significant bandwidth penalty by the use of a parallel input signature generator in combination with a logic analyzer.

Where the outputs from one module form the inputs to another module, it is only necessary to monitor the outputs from the modules.

Where any set of signals form a word driven by only one module on any particular clock, no signal in the set ever being used by the trace analyzer to determine which module drove some other signal, (this often applies to a data bus), compressed rather than complete words input to and/or output from the modules can be used by the signature generator and/or stored by the logic analyzer.

Preferably, the logic analyzer comprises a trigger input for receiving a trigger input signal, the logic analyzer responding to an input at the trigger input to supply the stored signals for analysis.

To identify the first difference, the logic analyzer preferably has a storage capacity at least sufficient for a maximum delay between the input of an erroneous signal to the signature generator and an output from the signature generator reflecting the erroneous signal.

A robust signature provides a high probability of a difference in inputs providing a difference in the output signature. In a preferred embodiment of the invention the signature generator produces a robust signature which is dependent upon all current inputs thereto and all previous inputs thereto.

A desirable implementation of a signature generator is a parallel input linear feedback shift register. More preferably, the signature generator comprises a plurality of parallel input linear feedback shift registers arranged in parallel to each other, each of the plurality of parallel shift registers having a serial output, and a further parallel input linear feedback shift register having each of its parallel inputs connected to the serial output of a respective one of the plurality of parallel shift registers. A parallel output can be taken from respective stages of the further parallel shift register, or a serial output can be taken from a serial output of the further parallel shift register.

A trace analyzer, implemented in hardware or software, can be provided for receiving the signals stored in each logic analyzer, the trace analyzer being arranged to search the signals stored in the logic analyzer to locate a first difference in operation, to determine which internal module apparently provided a faulty output and to label the module as faulty.

The invention also provides an integrated circuit comprising a system or subsystem as described above.

DESCRIPTION OF THE DRAWINGS

An embodiment of the invention will be described hereinafter with reference to the accompanying drawings in which like reference signs relate to like features and in which.

DETAILED DESCRIPTION OF THE PREFERRED EMBODIMENT

A logic analyzer is a conventional instrument in electronic design. A logic analyzer stores the value of its inputs, every clock, into a continuously updated memory, until it is triggered. After being triggered, the analyzer may continue storing for a while, then cease operations so that the trace of stored inputs may be examined. It can be arranged that the eventual trace contains information about inputs both before and after the trigger event.

Figure 4:
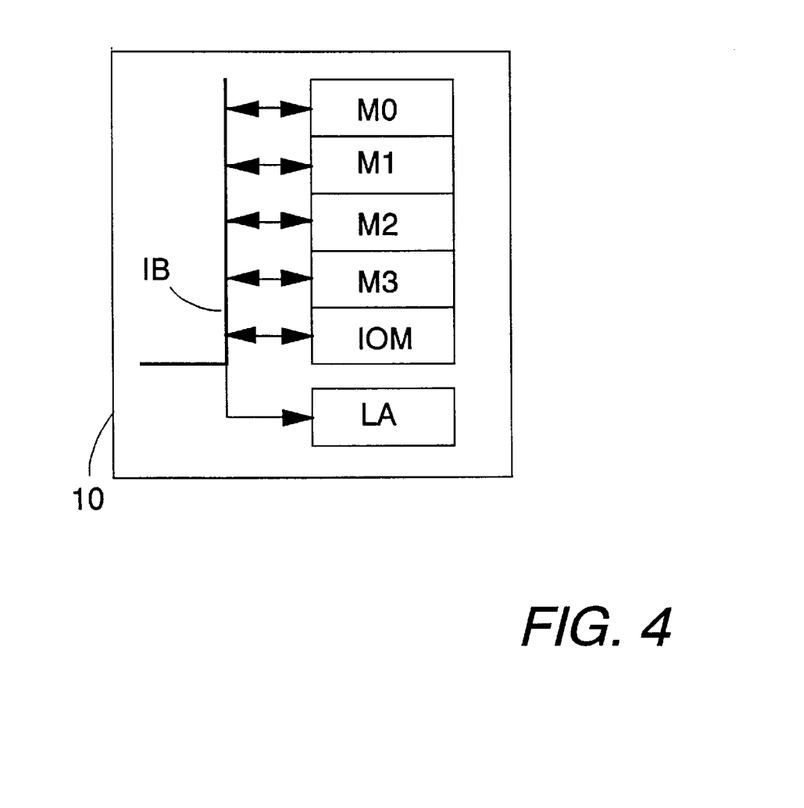
FIG. 4 is a schematic representation of a processor set of an embodiment of the invention.

FIG. 4 illustrates elements of part of an embodiment of the invention. In this embodiment a logic analyzer LA is built into each processing set. As illustrated in FIG. 4, the logic analyzer LA is connected to each of the processing modules M0–M3 such that it can observe all of the inputs and all of the outputs of each processing module in that processing set. Of course, some processing module outputs are also the inputs of another processing module, and just one set of logic analyzer connections suffices for both. In the limit, it may be that all the processing modules exchange data among themselves and to the I/O module IOM along a single internal bus IB. This is the common arrangement in a computer where the various modules are plug-in cards that connect to a backplane. In this case, the logic analyzer has only to observe all the bus signals, every clock, to record all the input and output signals of every module.

The logic analyzers LA in all the processing sets 10, 11, 12 are triggered when the processing sets begin to operate differently. Then, once software or hardware has identified the faulty processing set (for example by majority voting or by another process), trace analyzer software can extract and examine the logic analyzer LA contents from both the faulty processing set and a good processing set. The software is set up to interpret the stored logic analyzer contents and find the first difference in the logic analyzer traces between the processing sets. Using these traces, it can work out which module M0–M3, IOM in the processing sets 10, 11, 12 drove that signal on that clock. That processing module M0–M3, IOM is then known to be the faulty one. In the present embodiment, the trace analyzer is implemented in software on the voter 17.

Any difference at any time in the operation of the processing sets 10, 11, 12, whether immediately visible or not, can lead at some later time to a divergence which becomes apparent. An error in any signal internal to a processing module M0–M3, IOM, not visible to a logic analyzer LA, can change the internal stored state of that module M0–M3, IOM. At some much later time, the module M0–M3, IOM can produce a visible difference at its output because of its change in internal state. However, whether the fault happened recently or long ago, whether it happened at the output signals of the module M0–M3, IOM or deep inside, the fault is still specific to that module M0–M3, IOM and no other. As soon as the fault becomes visible at the output, the faulty module M0–M3, IOM can be identified.

It is critical to trigger the logic analyzers LA when the first divergent operation occurs at a processing module output. However, the processing modules M0–M3, IOM communicate among themselves and do not send every output through the I/O module to the voter 17. If any difference can go unnoticed, it can cause some upset in the internal stored state of a perfectly functional processing module. At some later time, this changed state could produce a divergent output which would trigger the analyzers LA, and the wrong processing module M0–M3, IOM might be diagnosed as faulty. Comparing every output of every module on every clock with its twin in the other processing sets is typically not practical—the bandwidth requirements would be immense.

An embodiment of the invention enables the logic analyzers LA to be triggered when the first difference occurs, without using much bandwidth for the comparison.

In an embodiment of the invention, the logic analyzers LA in the processing sets can observe all the processing module M0–M3, IOM outputs. An embodiment of the invention enables the logic analyzers to be triggered when the inputs to one analyzer differ from those at another analyzer, without using direct comparison of all the signals. In order to achieve this, an embodiment of the invention transforms the inputs to the analyzer into a signature, and then compares the signatures.

The signature provides a digital variable that depends in a complex way on the inputs to the signature. There is a high probability that any reasonably different pattern of inputs will produce a different signature. This is needed in order not to miss divergent operation when the signatures are compared. Providing a signature generator which produces a signature which is dependent on all past as well as all current inputs to the logic analyzer, allows the comparison of signatures at a rate of less than one signature per clock. Even a one-bit divergence will cause an upset in the internal stored state of the signature that will persist until the next comparison of signatures between processing sets. In the following, a signature which has the property of providing a high-probability-of-difference is termed a 'robust' signature.

A robust signature can be generated in different ways. In a preferred embodiment of the invention, a linear feedback shift register is used as the basis of a signature generator. "Logic Design Principles: with emphasis on testable semicustom circuits", by McCluskey, Edward J, Prentice-Hall, 1986 (ISBN 0-13-539768-5), describes a parallel input signature generator (PISG) which can accept one input word per clock.

Figure 5:
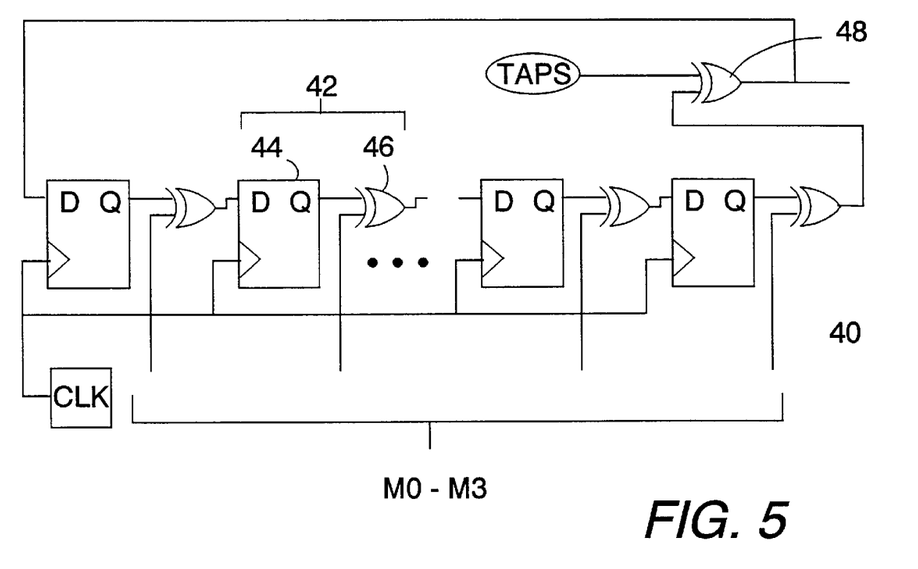
FIG. 5 is a schematic representation of a parallel input linear feedback shift register.
Figure 6:
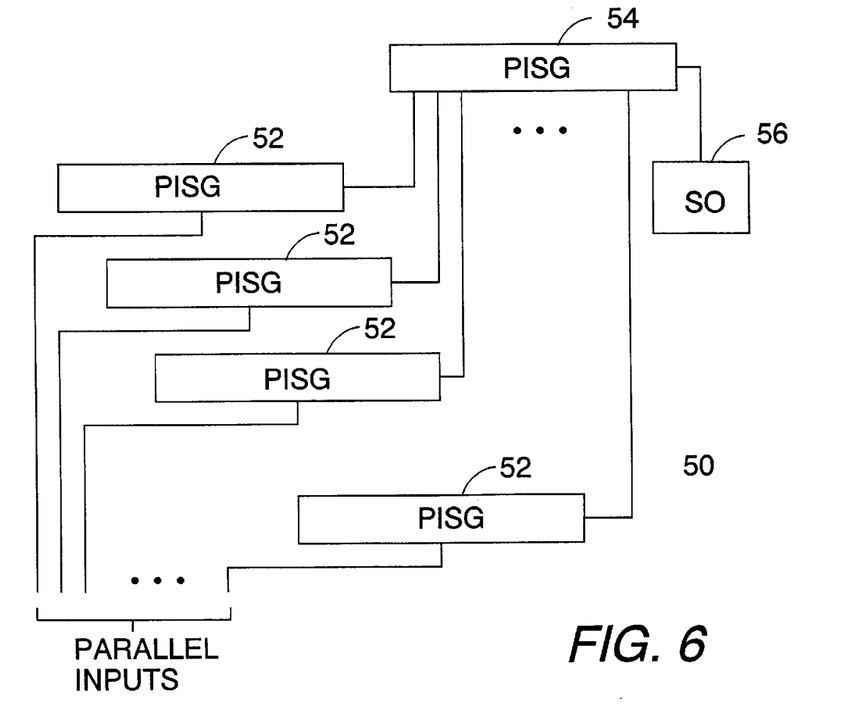
FIG. 6 is a schematic representation of an example of large capacity parallel input signature generator.

FIG. 5 illustrates an example of parallel input signature generator (PISG) using a linear feedback shift register 40. The linear feedback shift register 40 shown in FIG. 5 comprises a plurality of buffer stages 42, each comprising a latch 44 and an exclusive OR gate 46. One input of each EXOR gate 46 is connected to the output of the corresponding latch 44, and the other input is connected to a respective bit of the output from one of the modules M0–M3 of the processing set 10, 11 or 12. A parallel word is thus entered to the parallel input linear feedback shift register 40 each clock, and is shifted along each clock. The output signature is supplied at the output of a further EXOR gate 48. In order that the output signature is dependent on the current and all previous inputs in a complex way, the EXOR gate 48 receives taps from selected D-type latch outputs. The connections are not shown in FIG. 5. With the circuit of FIG. 5, if the signature generator is designed for an N-bit input word, there is a delay of up to N clocks before a change in the input affects the output bit stream. It is advantageous to minimise this delay. This is possible using a 2-dimensional version of the parallel input signature generator circuit. FIG. 6 shows a PISG circuit 50 that has a maximum delay of 64 clocks from input to output for a 1024-bit input word. More dimensions can be used in the circuit to give even lower delays. The PISG 50 comprises a plurality (e.g. 32) of parallel input signature generators 52 (e.g. each formed by a 32-bit linear feedback shift register 40 as in FIG. 5), the outputs of which are supplied to respective inputs of a further parallel input signature generator 54 (e.g. also formed by a 32-bit linear feedback shift register 40 as in FIG. 5).

The signature can be formed by the bit stream 56 at the output of circuit of FIG. 6. Alternatively, the contents of the final 32 bit PISG 54, taken in parallel, can be used to form the signature. These two alternatives effectively have the same information content. In order to use the circuit to compare the operation of two lockstep processing systems, the parallel inputs of the signature generator are wired to all of the signals to be compared. At each clock of the circuits, a signature is built up in the PISG 50 that is dependent on the exact behaviour of the inputs. The precise relationship between the input values and the generated signature is complex, but, for a robust generator, there is a very high probability that a difference in inputs will lead to a different signature. A much lower bandwidth for comparison is needed because of the compression of the information on the operation of each component of the lockstep system. The signatures of the processing sets can be compared. If the signatures differ, then it can be deduced that the processing sets are definitely not operating in lockstep.

Figure 7:
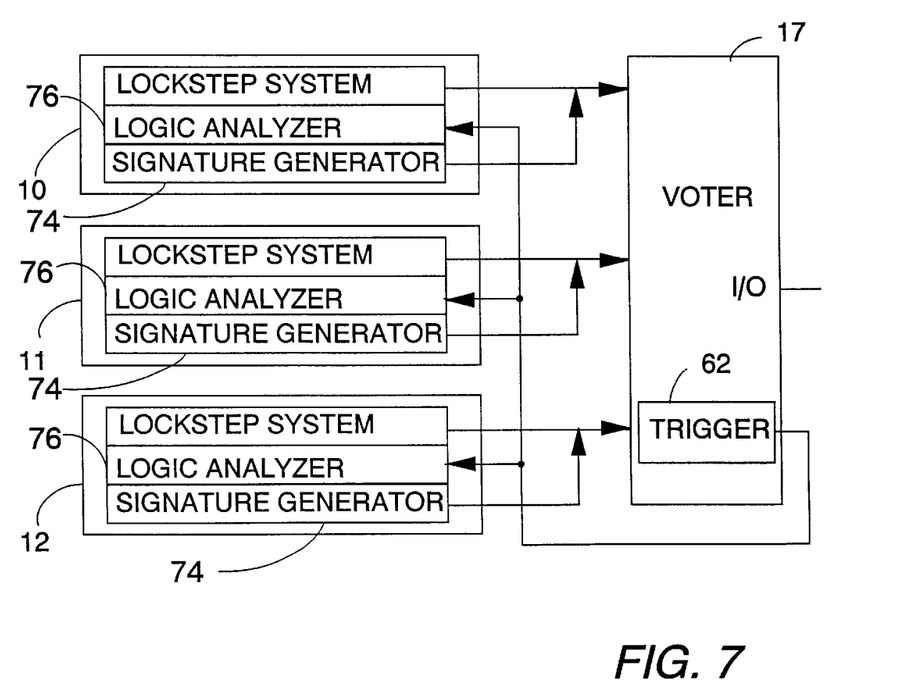
FIG. 7 is a schematic block diagram illustrating the operation of an example of a system in accordance with the invention.

FIG. 7 illustrates an example of the invention in which a signature comparison circuit 62 in the voter 17 receives the output from the signature generator 74 in each of the lockstep subsystems (processor sets). The output of the signature comparison circuit 62 is connected to trigger the logic analyzers 76 in each of the processing sets 10, 11, 12. The signature generators transmit a difference of inputs to the signature output within a known number of clocks. Accordingly, by providing the logic analyzers 76 with memory storage for at least this number of clocks before the trigger event, it can be ensured that the analyzer traces for each of the logic analyzers contain the first difference in operation between the lockstep subsystems. This allows software or hardware to search for the first difference and locate the processing module sending the first erroneous datum with a high degree of confidence.

The comparison of signature values can be made using the same data path as is used for normal computer I/O. 32-bit signatures can be sent over this path from each lockstep subsystem to the voter 17. The voter 17 has logic for comparing parallel data values for equality. This same logic can be used for comparing signatures. The signature words are labelled with a special code indicating that they are signatures and not normal I/O. The voter 17 logic therefore merely compares the values and does not transmit the signatures as I/O commands. In a preferred embodiment of the invention this does not have to happen every clock, or even every 32 clocks. Signature values depend on the total history of the inputs to the PISG 50. Some time may go by between comparisons, with a difference in inputs to two PISGs 50 in the middle of this period. When the signatures are compared at the end of the period, they will still show a difference due to the dependence on the previously generated signals. This characteristic can be used to reduce the bandwidth required for comparison still further.

Consider the lockstep subsystems of a fault tolerant computer with 1024 inputs connected to the logic analyzer/PISG circuit in each lockstep subsystem, each input defined on every edge of a 100 MHz clock. This represents a raw bandwidth of 100 Gbits/second. The PISG compresses the 1024 input signals to a 32 bit signature, which also changes every clock. Comparing this every clock would need 3.2 Gbits/second. However, if the signature is compared every 1000 clocks (10 $\mu$s), the bandwidth drops to just 3.2 Mbits/second, which is a pedestrian rate compared to current computer I/O bandwidths. This delay in comparing signatures does increase the storage needed in the logic analyzer sections of the circuit. If the PISG transfers its input to its output in at worst 64 clocks, and there is an additional delay of up to 1000 clocks in comparison, then the logic analyzers need to store at least 1064 input data words before their trigger event. This is not an unusual storage depth for a logic analyzer circuit. Thus, the signature comparison and logic analyzer trigger process can use the standard I/O connections to the voter without using much of the total available I/O bandwidth.

It is also possible to use a completely independent path for the signature comparison and logic analyzer trigger signals. This can be appropriate for an embodiment where the lockstep subsystems are plugged into a single backplane, so that the extra cost of additional interconnections is small. It is then possible to compare the signatures bitwise, at one bit per clock, with little extra hardware and low delays, shortening the required logic analyzer depth.

The decomposition of a lockstep subsystem into multiple deterministic modules shown in FIG. 2 can be extended to even finer granularity. For maintenance, the replaceable module is the useful unit of analysis, as shown in FIG. 2. All that is needed is to identify the module that has operated differently so that a maintenance technician can replace it with a working module. For system development, and for detailed analysis of field failures to chip level and beyond, the logic analyzer/PISG scheme can be applied within individual pluggable modules. Indeed, it is entirely practical to integrate a logic analyzer and signature generator into individual chips, so that the chips themselves can provide diagnostic information on chip malfunction.

Figure 8:
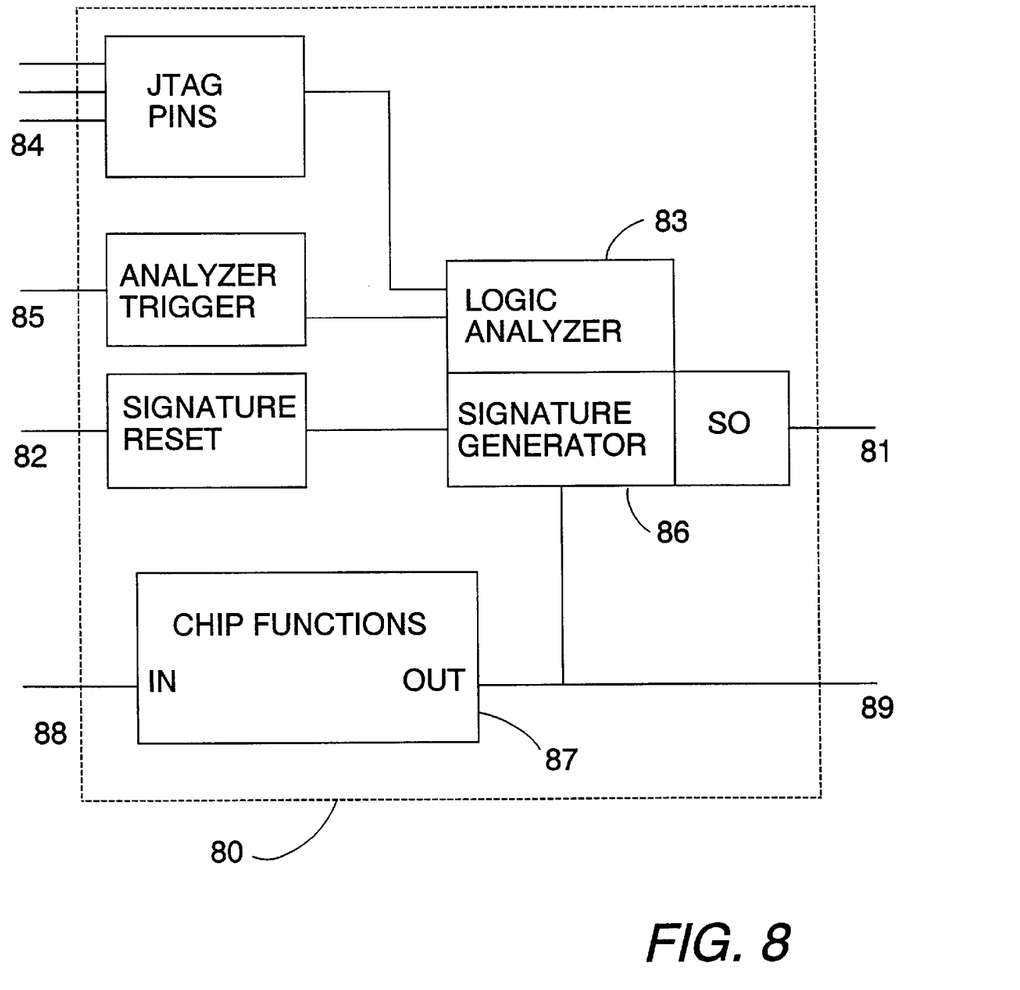
FIG. 8 is a schematic block diagram representing an example of an application of the invention to an integrated circuit.

FIG. 8 shows how the additional logic can be incorporated in a conventional chip 80 without too great a penalty. A single new pin 81 is added for the signature output of a single chip. The signature is transmitted serially and can be sent directly to a comparator circuit or can be used as an input to another PISG circuit to reduce comparator bandwidth. The main chip circuits 87 have chip inputs 88 and outputs 89. The signature generator 86 is connected to receive the outputs 89 from the main chip circuits 87. The signature is reset to a predefined value by the signature reset pin 82. This allows the signatures for the various lockstep modules to start in sync. The signature reset pin 82 may be sharable with a conventional reset input to the chip 80. The logic analyzer 83 is controlled by the JTAG test port 84 of the chip. Many chips now have JTAG test ports for checking the function and connections of the pins in circuit, and adding a capability to control and read out the logic analyzer 83 needs no new pins. The logic analyzer 83 trigger input 85 comes from the comparison logic and is asserted when there is a signature mismatch.

The circuit of FIG. 8 shows the logic analyzer/PISG (LA/PISG) circuit connected only to the outputs 89 of the chip. This is adequate presuming that all the chips in the system have this design added, and that the outputs of one chip are faithfully transmitted to become the inputs of other chips. More complete coverage is obtained by having the LA/PISG inputs sense all the synchronous I/O pins 88 and 89 of the chip. This can allow this chip to provide information about other chips on the board which do not have LA/PISG circuits. Quite good coverage of most of a design can be obtained when as little as half the chips include LA/PISG circuits.

The use of LA/PISG circuits within a processing module provide an excellent method of diagnosing low rate chip faults. Some of the most commercially damaging computer faults are those affecting individual chips occasionally, because of noise sensitivity, temperature effects and the like. Failure rates for such faults can be as low as one failure in several months, yet these faults can severely impact profitability. Being so rare, these faults are exceedingly difficult to locate and eradicate. This is applicable to lockstep fault tolerant systems, but that is where the ultimate in reliability and diagnosability is required.

LA/PISG circuits, because of the low pin count and bandwidth requirements, can be used to pinpoint faults down to individual gate level inside a chip. The logic analyzer and signature generator circuits can sense key signals inside chips, not available at I/O pins, to locate obscure faults in logic design or noise immunity. Hundreds or thousands of signals can be compared between two lockstep chips, and logic analyzers for them triggered, with just a few extra I/O pins.

All the signature generators to be compared must start off in a determined state on the same clock edge (they must be synchronised). This is a well-understood problem in lockstep fault tolerant design. Entire lockstep subsystems have to be reset to a consistent state so that they may run in sync. There are many ways of making this happen. A wholly practical method is to assert reset inputs to each chip containing state information. If reset is asserted and negated synchronously with the clock on all the subsystems that are to run in sync, on the same clock edges everywhere, the subsystems start in the same state. Exactly the same holds true for the LA/PISG circuits, which can be considered an extension of the ordinary lockstep modules.

Account needs to be taken of non-deterministic signals. It often happens that it is convenient to allow some of the signals in a computer system to remain undefined. A routine example is the unused portion of a data bus used for a partial write. Only the data bus pins corresponding to the bits of data being written will be defined, and other pins will have indeterminate data and may differ on two lockstep subsystems.

Because the computers in question here are lockstep fault tolerant ones, they tend to have few indeterminate signals. What indeterminate signals that do exist must be ignored by the voter circuits. This can be done, for example, by examining the byte strobes on a bus write operation to find which data bus bits are valid and which should be discarded.

Non-determinate signals in logic analyzer traces have to be discarded in the search for the first difference. This can be done either by software which interprets the trace after a trigger event, or by hardware which fixes the value of the stored input as it is collected. However, this choice is not available when it comes to generating the signatures. Any indeterminate data input to the signature generator is going to result in a signature comparison error in a very short time. This is not recoverable by software. Therefore, the signature generator has to be fed with clean data, with any indeterminate values masked out by logic examining and interpreting the input as it happens.

The built-in logic analyzers can be used for other purposes. This is advantageous as logic analyzers are quite an expensive part. The conventional use for a logic analyzer in computer design is to debug software during development. The built in logic analyzer can be used for this purpose as long as it is equipped with extra trigger capability. Triggering under software control is adequate for most debugging.

When the LA/PISG approach is used for locating module failures at runtime, the logic analyzers are running all the time on the customer site. They are thus useful for capturing traces of software failures. Software can be programmed to trigger the analyzers automatically when the software detects some problem. It is entirely possible, of course, that such a problem would happen simultaneously on the lockstep subsystems, in sync, so would not trigger the analyzers without software intervention.

For the purpose of software diagnosis, it is convenient to capture fewer cycles in the logic analyzer, to extend the capture period over longer time periods with the same analyzer memory depth. It is possible to do this by capturing input data only when the input lines are active, perhaps when a bus cycle is in progress, and ignoring the input lines when the inputs are idle. In order to ensure that the same data is being moved on the same clock edge in the lockstep subsystems, a timestamp then needs to be added to both logic analyzer and signature generator inputs. This timestamp can be as simple as a counter which increments by one every clock. If the lockstep subsystems capture the same data on different clocks because of some mis-operation, the differing timestamps will immediately detect the error.

Measures can be provided to reduce the chance of misdiagnosis. There are various ways in which this automated diagnosis can go wrong. Some of these can be circumvented by adding features to the software.

Any appropriate technique (for example majority voting) can be used for selecting the faulty processing set. The selection of the processing set which contains the faulty module does not form the subject of the present invention, rather the invention is concerned with the selection of the processing module within a processing set which is faulty, after having decided upon the faulty processing set. It is possible that the method for choosing the faulty processing set was at fault, and the wrong processing set has been chosen. The LA/PISG approach will find a difference in operation and identify a processing module as faulty. It will be the right module, but it might be in the wrong processing set. This error is more likely in dual-modular-redundant (DMR) systems where the wrong processing set may be chosen to survive.

To counter this problem, the diagnosing software can be arranged to judge the possibility that the wrong processing set has been chosen to carry on, and give guidance. It can be arranged to report on statistical basis. For example, it may initially report: "I think that module 2 in processing set 10 is broken, but there's a chance it is module 2 in processing set 11." By keeping a history of its analyses, it might be able to conclude, if module 2 in processing set 11 appears to fail repeatedly despite being changed, that the problem is in fact with module 2 in processing set 10, and the software should try that.

The LA/PISG approach is directed to identifying the module that is transmitting the erroneous datum. If the module output is a conventional two-state signal, the software would always label the module as faulty when the signal erred. However, this discounts the possibility that some other module is driving excess current onto the output line. This can occur because of a simple mechanical short circuit in the interconnections or because another module has a faulty receiver on its input lines.

The diagnostic ability can be improved by looking for multiple errors in a single word. Multiple errors are less likely to be caused by a single fault in the interconnections and more likely to be caused by a single fault within the module. If the module output is a three-state or opencollector bus, there is more of a chance of multiple corruptions in one event. Another check here is to generate an error detection code within the module alongside the transmitted data. If the code is right but the output is wrong, there is at least some chance that the problem lies with the interconnection to another module and not within the identified module. If the code is wrong and the output is wrong, but the code matches the output, it is pretty certain that the fault lies within the identified module. For reasonable coverage, more than just parity on a data word is needed here, because parity has a 50% chance of being right anyway. Turning every signal line into its own self-checking code is an excellent method. If the signals are transmitted as wired-or ECL differential pairs, any short or mistaken driver leads not only to the wrong data being transmitted but also to an immediately identifiable interconnect problem. The data lines will not be transmitted as the normal (0,1) or (1,0) pair values. Such a scheme does not require a doubling of the size of the logic analyzer and signature generator. Error detection circuits can be provided, observing the output signals, and the outputs of these error detection circuits can feed inputs of the LA/PISG circuits. Just a few more signals provide fault coverage for all the observed signals.

Note that it is not important to have error detecting codes within a replaceable module. It is only useful to have error detecting codes passed around the interconnections between modules. This can aid in deciding when the incorrect module has been diagnosed as faulty because the problem lies in the interconnect, not the module.

Another mechanism for fault isolation uses checking circuits at the output of modules. Each module can check by observation that its output signals are actually the voltage that it expects them to be. If the module detects an error, it can assert a single shared line meaning "there may be an interconnect, not a module, problem."

There has been described a fault tolerant computer system comprising a plurality of lockstep subsystems, each of which comprises a parallel input signature generator which is used for data compression to allow practical comparison of the operation of internal modules of the lockstep subsystem and a logic analyzer which stores the outputs of the internal modules of the lockstep subsystem, the analyzer being triggered by the mis-comparison of the signatures and storing enough states to include the first difference, and a signature comparator connected to receive the signatures from the signature generators of the individual lockstep subsystems, the lockstep generator generating a trigger signal for triggering the logic analyzers on detecting a difference in the signatures. Software automatically searches the logic analyzer traces after an out-of-sync event to locate the first difference in operation. The software determines which internal module provided that faulty output and labels that module as broken. Software and hardware design choices can be made to reduce or eliminate the confusion caused by faults in the interconnections rather than the modules.

The system can be applied to the replaceable internal modules of a lockstep computer as an aid to maintenance, It can also he repeatedly applied to smaller units to identify failing chips or even the failing gate within a chip.

The LA/PISG approach allows automatic diagnosis of the failed module from a single failure event with a very high probability of success.

Embodiments of the invention can be implemented by integration within an integrated circuit because it uses few pins on the chip. It allows automated diagnosis of internal chip faults at the gate level which may not be possible in any other way.

In the embodiment described above, the signature generator and the logic analyzer of a processing set receive all of the bits of words output by the modules of the processing set. However, a special case applies when a set of signals form a word such that: (a) all signals in the set are driven by the same module on any particular clock; and (b) the signals are never used by the trace analyzer to determine which module drove some other signal. This often applies to a data bus. In this case, it is not necessary for either the signature generator to use, or the logic analyzer to store every signal in the word. For example, a 64 bit word could be compressed to an 8 bit value and still provide a 255/256 probability that an error in the input word will be detectable. For the cases where both conditions apply, this is a useful reduction in circuit complexity.

Compression logic can be provided for words taken from the bus. Compressed words can be used as an input to the signature generator or the logic analyzer or both. Alternatively, the compression logic may be incorporated into the logic analyzer or the compression logic or both. Direct signals and compressed words can be used in the same system depending on which signal is being observed. Where a word compression function is used to reduce the input word size for either the signature generator or the logic analyzer, the masking of indeterminate bits in the word must occur before the word is presented to the compression logic. It should be noted that the potential utility of the logic analyzer for debugging may be reduced when input compression is used.

Although particular embodiments of the inventions have been described, it will be appreciated that the invention is not limited thereto, and many modifications and/or additions may be made within the spirit and scope of the invention as defined in the appended claims. For example, different combinations of the features of the dependent claims may be combined with the features of the independent claims.

What I claim is:

1. A subsystem for a fault tolerant computer system comprising a plurality of said subsystems, said subsystem comprising:

at least one module having an input and an output;

a signature generator having at least one input and at least one output, said at least one input of said signature generator being connected to receive signals from at least one of said input and said output of each module and said signature generator generating, at said at least one output, a signature which is a function of signals received at said at least one input of said signature generator; and a logic analyzer connected to receive and store signals from at least one of said input and said output of each module.

2. A subsystem according to claim 1, wherein said signature generator is connected to receive whole words output from each module.

3. A subsystem according to claim 1, wherein said signature generator generates said signature on the basis of compressed words derived from words output from each module.

4. A subsystem according to claim 1, wherein said logic analyzer stores compressed words derived from words output from each module.

5. A subsystem according to claim 1, wherein said logic analyzer comprises a trigger input for receiving a trigger input signal, said logic analyzer responding to an input at said trigger input to supply said stored signals for analysis.

6. A subsystem according to claim 5, wherein said logic analyzer has a storage capacity at least sufficient to store all signals received during a maximum delay between the input of an erroneous signal to said signature generator and an output from said signature generator reflecting said erroneous signal, whereby on triggering said logic analyzer, said error signal will still be stored in said logic analyzer.

7. A subsystem according to claim 1, wherein said signature generator produces a robust signature.

8. A subsystem according to claim 1, wherein said signature generator produces a robust signature which is dependent upon all current inputs thereto and all previous inputs thereto.

9. A subsystem according to claim 1, wherein said signature generator comprises a parallel input linear feedback shift register.

10. A subsystem according to claim 1, wherein said signature generator comprises a plurality of parallel input linear feedback shift registers arranged in parallel to each other, each of said plurality of parallel shift registers having a serial output, and a further parallel input linear feedback shift register having each of its parallel inputs connected to said serial output of a respective one of said plurality of parallel shift registers.

11. A subsystem according to claim 10, wherein said signature generator has a parallel output taken from respective stages of said further parallel shift register.

12. A subsystem according to claim 10, wherein said signature generator has a serial output taken from a serial output of said further parallel shift register.

13. An integrated circuit comprising a subsystem according to claim 1.

14. An integrated circuit according to claim 13 comprising a signature output pin.

15. An integrated circuit according to claim 13 comprising a reset pin, connected to said signature generator for resetting said generator to a predetermined input.

16. A fault tolerant computer system comprising:

a plurality of subsystems, wherein each said subsystem comprises at least one module having an input and an output, a signature generator having at least one input and at least one output, said at least one input of said signature generator being connected to receive signals from at least one of said input and said output of each module and said signature generator generating, at said at least one output, a signature which is a function of signals received at said at least one input of said signature generator, and a logic analyzer connected to receive and store signals from at least one of said input and said output of each module; and a signature comparator connected to receive said signature from said output of said signature generator of each of said subsystems, said signature comparator having a trigger output connected to a trigger input of said logic analyzer in each said subsystem and generating a trigger signal on detecting a mis-comparison between said signatures.

17. A system according to claim 16, wherein, in said subsystem, said signature generator is connected to receive whole words output from each module of said subsystem.

18. A subsystem according to claim 16, wherein, in a said subsystem, said signature generator generates said signature on the basis of compressed words derived from words output from each module of said subsystem.

19. A subsystem according to claim 16, wherein, in a said subsystem, said logic analyzer stores compressed words derived from words output from each module of said subsystem.

20. A system according to claim 16, wherein said logic analyzer in a said subsystem is responsive to an input at said trigger input to supply said stored signals for analysis.

21. A system according to claim 16, wherein said logic analyzer in each subsystem has a storage capacity at least sufficient to store all signals received during a maximum delay between the input of an erroneous signal to said signature generator and an output from said signature generator reflecting said erroneous signal, whereby on triggering said logic analyzer, said error signal will still be stored in said logic analyzer.

22. A system according to claim 16, wherein each said signature generator produces a robust signature.

23. A system according to claim 16, wherein each said signature generator produces a robust signature which is dependent upon all current inputs thereto and all previous inputs thereto.

24. A system according to claim 16, wherein each said signature generator comprises a parallel input linear feedback shift register.

25. A system according to claim 16, wherein each said signature generator comprises a plurality of parallel input linear feedback shift registers arranged in parallel to each other, each of said plurality of parallel shift registers having a serial output, and a further parallel input linear feedback shift register having each of its parallel inputs connected to said serial output of a respective one of said plurality of parallel shift registers.

26. A system according to claim 25, wherein each said signature generator has a parallel output taken from respective stages of said further parallel shift register.

27. A system according to claim 25, wherein each said signature generator has a serial output taken from a serial output of said further parallel shift register.

28. A system according to claim 16, comprising a trace analyzer for receiving said signals stored in each logic analyzer, said trace analyzer being arranged to search said signals stored in said logic analyzer to locate a first difference in operation, to determine which internal module apparently provided a faulty output and to label said module as faulty.

29. An integrated circuit comprising a system according to claim 16.

30. A method of identifying a faulty module in a subsystem of a fault tolerant computer system, said fault tolerant computer system comprising a plurality of subsystems, and each said subsystem comprising at least one module having an input and an output, said method comprising the steps of:

a) generating a signature in a signature generator connected to receive signals from at least one of said input and output of said at least one module, said signature being a function of signals received at said at least one input of said signature generator;

b) generating a logic analyzer trace including storing signals in a logic analyzer connected to receive signals from at least one of said input and said output of each module;

c) comparing, in a signature comparator, the outputs of said signature generator of each subsystem;

d) triggering said logic analyzer in each subsystem on detecting a mis-comparison between said signatures; and e) comparing said signals stored in each logic analyzer to determine a first difference between said stored signals as indicative of a faulty module.

31. A method according to claim 30, wherein, in said subsystem, said signature generator is connected to receive whole words output from each module of said subsystem.

32. A method according to claim 31, wherein in step (a) said signature is generated on the basis of compressed words derived from words output from each module of said subsystem.

33. A system according to claim 30, wherein step (b) said logic analyzer stores compressed words derived from words output from each module of said subsystem.

34. A method according to claim 30, wherein step (a) comprises generating a robust signature.

35. A method according to claim 30, wherein step (a) comprises generating a robust signature which is dependent upon all current inputs thereto and all previous inputs thereto.

36. A method according to claim 30, wherein step (a) comprises providing a parallel signature comprising a word taken from respective stages of a parallel input linear feedback shift register.

37. A method according to claim 30, wherein step (a) comprises providing a serial signature comprising a series of bits taken from a serial output of a parallel input linear feedback shift register.

38. A method according to claim 30, wherein step (c) comprises:

analysing said signals stored in each logic analyzer to locate a first difference in operation:

determining which internal module apparently provided a faulty output; and labelling said module as faulty.

* * * * *